US008422082B2

(12) United States Patent
Couwenhoven et al.

(10) Patent No.: US 8,422,082 B2
(45) Date of Patent: *Apr. 16, 2013

(54) REDUCING INK BLEED ARTIFACTS FOR RGB IMAGES

(75) Inventors: Douglas W. Couwenhoven, Fairport, NY (US); Kevin E. Spaulding, Spencerport, NY (US); Steven A. Billow, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 924 days.

This patent is subject to a terminal disclaimer.

(21) Appl. No.: 12/507,226

(22) Filed: Jul. 22, 2009

(65) Prior Publication Data

US 2011/0019238 A1  Jan. 27, 2011

(51) Int. Cl.
*H04N 1/407* (2006.01)
(52) U.S. Cl.
USPC .......... 358/3.26; 358/1.9; 358/3.27; 358/518; 347/15; 347/43
(58) Field of Classification Search .................. None
See application file for complete search history.

(56) References Cited

U.S. PATENT DOCUMENTS

| 5,168,552 | A |   | 12/1992 | Vaughn et al. |
| 5,428,377 | A | * | 6/1995 | Stoffel et al. .................. 347/15 |
| 5,568,169 | A |   | 10/1996 | Dudek et al. |
| 5,570,118 | A |   | 10/1996 | Rezanka et al. |
| 5,596,355 | A |   | 1/1997 | Koyama et al. |
| 5,635,967 | A |   | 6/1997 | Klassen |
| 5,699,492 | A |   | 12/1997 | Karaki |
| 5,751,310 | A |   | 5/1998 | Yano et al. |
| 5,809,215 | A |   | 9/1998 | Heydinger et al. |
| 5,933,577 | A | * | 8/1999 | Naitoh et al. ................... 358/1.9 |
| 5,975,678 | A |   | 11/1999 | Kanematsu et al. |
| 5,992,971 | A |   | 11/1999 | Takahashi et al. |
| 6,007,182 | A |   | 12/1999 | Matsubara et al. |
| 6,015,206 | A |   | 1/2000 | Heydinger et al. |
| 6,118,548 | A |   | 9/2000 | Ryan |
| 6,164,756 | A |   | 12/2000 | Takahashi et al. |
| 6,259,536 | B1 |   | 7/2001 | Coleman |
| 6,270,186 | B1 |   | 8/2001 | Smith et al. |
| 6,312,102 | B1 |   | 11/2001 | Moriyama et al. |
| 6,361,144 | B1 | * | 3/2002 | Torpey et al. .................... 347/43 |
| 6,412,938 | B1 |   | 7/2002 | Markham et al. |
| 6,621,604 | B2 | * | 9/2003 | DeLean ......................... 358/518 |
| 7,173,734 | B2 |   | 2/2007 | Klassen et al. |
| 7,234,791 | B2 | * | 6/2007 | Couwenhoven et al. ........ 347/15 |
| 7,271,936 | B2 | * | 9/2007 | Walmsley et al. ............ 358/3.06 |
| 7,652,795 | B2 | * | 1/2010 | Couwenhoven et al. ..... 358/3.26 |
| 2004/0114158 | A1 |   | 6/2004 | Klassen et al. |
| 2006/0238555 | A1 |   | 10/2006 | Couwenhoven et al. |

FOREIGN PATENT DOCUMENTS

EP  0 697 784  2/1996

* cited by examiner

*Primary Examiner* — Dung Tran
(74) *Attorney, Agent, or Firm* — Kevin E. Spaulding

(57) ABSTRACT

A method for modifying an input digital image having three color channels, to form a modified digital image suitable for use by an inkjet printer having reduced ink bleed artifacts comprising computing a transformed digital image containing at least a black color channel and a color dependent scale factor channel, computing a filtered black color channel using a convolution operation, and forming the modified digital image in response to the corresponding pixel values of the color dependent scale factor channel and the filtered black color channel, so that when the modified digital image is used to produce a printed image on an inkjet printer there are reduced ink bleed artifacts.

20 Claims, 14 Drawing Sheets

| CMY | COLOR NAME | VALUE |
|-----|------------|-------|
| 000 | WHITE | 1.0 |
| 001 | YELLOW | 1.3 |
| 010 | MAGENTA | 1.2 |
| 011 | RED | 1.4 |
| 100 | CYAN | 0.9 |
| 101 | GREEN | 0.9 |
| 110 | BLUE | 1.0 |
| 111 | BLACK | 1.0 |

REDUCING INK BLEED ARTIFACTS FOR RGB IMAGES

CROSS REFERENCE TO RELATED APPLICATIONS

Reference is made to commonly assigned U.S. Pat. No. 7,652,795 issued Jan. 26, 2010 by Couwenhoven, et al., the disclosure of which is herein incorporated by reference.

FIELD OF THE INVENTION

This invention pertains to the field of inkjet printing systems, and more particularly to a method for reducing ink bleed artifacts.

BACKGROUND OF THE INVENTION

Ink jet printers have become a very common way for printing images from a computer. Ink jet printers work by spraying small drops of colorants (ink) onto a receiver to form an image. Typically, ink jet printers use four or more different colors of colorants to produce colored images. Most commonly cyan (C), magenta (M), yellow (Y), and black (K) colorants are used. Sometimes additional colorants such as red, green, blue, orange, light cyan, or light magenta are also used. A given set of colorants, together with the writing system used to spray the ink on the receiver, will have an associated color gamut, which is defined to be the set of colors that can be made using the printer. The different colors within the color gamut can be made by adjusting the amounts of the various colorants that are applied in a given region of the print.

One problem that has been common in ink jet printers is an artifact commonly referred to as "ink bleed." Ink bleed occurs when ink that is sprayed on the receiver in one location spreads laterally on the page to a region where it is not wanted. Ink bleed can result if too much ink is applied to the page in a given location such that the receiver cannot absorb the ink and it forms a puddle on the surface, which can then seep laterally.

Another source of bleed is due to differences in the chemical formulations of the inks. Typically, the chemical formulations of black inks are quite different than the chemical formulations of the colored inks. These differences can make the image particularly susceptible to bleed at interfaces between regions where black ink is applied, and regions where colored ink is applied. An example of this would be printing black text on a yellow background, or printing a pie chart having colored segments with a black border. An illustration of such an interface is shown in FIG. 1A. Here a first region 10 comprised of a large amount of black ink is adjacent to a second region 11 comprised of a large amount of colored ink, such as cyan, magenta, or yellow. The term "large amount" refers to an amount of ink sufficient to result in bleed artifacts. FIG. 1B illustrates the appearance of ink bleed artifacts 13 that can occur at the interface between the first region 10 and the second region 11. In this example, the black ink from the first region 10 can be seen to have seeped into the colored ink in the second region 11. However, bleed can also happen in the reverse direction as well. Often the bleed artifacts 13 take the form of small "fingers" of ink that grow out from one region to the other.

It is also common for the colored inks to have quite different chemical formulations from each other, resulting in variation of the bleed artifacts from color to color. For example, the bleed artifacts between black and cyan may be of lesser magnitude than the bleed artifacts between black and yellow, due to differences between the chemical formulations of the cyan and yellow ink.

There have been a number of approaches disclosed in the prior art to address this problem. In U.S. Pat. No. 5,168,552, Vaughn et al. disclose a method where composite black is changed to true black ink except when black dots are within a minimum spacing from color dots.

In U.S. Pat. No. 5,428,377, Stoffel et al. disclose a method for adjusting what ink(s) are used to print black image areas depending on whether the surrounding pixels contain black, colored, or blank content.

In U.S. Pat. No. 5,568,169, Dudek et al. disclose a method for adjusting usage of slow- and fast-drying black inks depending on whether the surrounding pixels contain any colored inks. The slow-drying ink is either totally replaced, or is selectively replaced.

In U.S. Pat. No. 5,570,118, Rezanka et al. disclose a method for reducing ink bleed by producing a small gap between a slow-drying black ink region and a fast-drying color inks region. In one embodiment, the gap is filled in with a fast-drying second black ink.

In U.S. Pat. No. 5,596,355, Koyama et al. disclose a dot judgment circuit for determining whether to print black pixels using a slow-drying black ink or fast-drying colored inks depending on whether color image content is surrounding the black pixels.

In. U.S. Pat. No. 5,635,967, Klassen discloses a method for reducing ink bleed for a binary image that involves blurring the binary image to form a continuous tone image, detecting edges in the continuous tone image, and reducing the number of pixels printed on the edge in the original binary image.

In U.S. Pat. No. 5,699,492, Karaki discloses a method for changing from pure black pixels to composite black pixels for black areas that are in contact with color areas.

In U.S. Pat. No. 5,751,310, Yano et al. disclose a method for replacing black ink with a process black in a border region where black and colored regions are adjacent. The border region is detected using an expansion operation.

In U.S. Pat. No. 5,809,215, Heydinger et al. disclose a method for reducing ink bleed whereby black pixels are altered when a certain fraction of nearby pixels contain colored ink. Methods for altering the black pixels include removing selected pixels or removing all of the pixels.

In U.S. Pat. No. 5,975,678, Kanematsu et al. disclose a method for selectively replacing black ink with colored inks depending on the proximity to colored regions. The degree of proximity is determined by doing a weighted sum according to an array of distance-weighted coefficients. Depending on the degree of proximity, more or less ink is substituted.

In U.S. Pat. No. 5,992,971, Takahashi et al. disclose a method whereby ratio of black and colored is adjusted according to the color content of nearby marginal pixels. In some embodiments, the amount of adjustment is dependent on distance between the current pixel and the marginal pixel.

In U.S. Pat. No. 6,007,182, Matsubara et al. disclose a method for adjusting what ink(s) are used to print black image areas depending on whether any surrounding pixels contain colored image data. In areas adjacent to colored regions, black is made using CMY inks. Otherwise, black ink is used.

In U.S. Pat. No. 6,015,206, Heydinger et al. disclose a method where ink bleed is reduced by printing process black and black ink in an alternating pattern for dots on the boundary between black regions and color regions.

In U.S. Pat. Nos. 6,084,604 and 6,312,102, Moryiama et al. disclose a method for adjusting what ink(s) are used to print black image areas depending on whether any surrounding pixels contain colored image data. In areas adjacent to colored regions, black is made using CMY inks, and using black ink elsewhere.

In U.S. Pat. No. 6,118,548, Ryan discloses a method for replacing black ink with a process black for regions near colored pixels. A logical search sequence is used to identify the nearest colored pixel.

In U.S. Pat. No. 6,164,756, Takahashi et al. disclose a method for reducing bleed by using a multipass mode for image regions where a boundary between a black image region and a colored image region is detected, and a faster single pass mode otherwise.

In U.S. Pat. No. 6,259,536, Coleman discloses a method for determining whether to use black ink or process black to print a black object depending on whether the black object is on a colored background.

In U.S. Pat. No. 6,270,186, Smith et al. disclose a method for reducing ink bleed in a multilevel ink jet printer capable of printing multiple numbers of drops at a given pixel location by reducing the number of pixels printed with more than one drop in a black/colored border region.

In U.S. Pat. No. 6,361,144, Torpey et al. disclose a method for reducing intercolor bleed using a color pixel modification pattern to remove a fraction of the color pixels near a color/black boundary, and using a black pixel modification pattern to replace black ink pixels near a boundary with colored inks.

In U.S. Pat. No. 6,412,938, Markham et al. disclose a method whereby bleed is reduced by printing black ink in a multipass mode using a larger print head, and colored inks are printed in a single-pass mode.

In U.S. Pat. No. 7,234,791, Couwenhoven et al. disclose a method of reducing intercolor bleed using a spatial filter applied to the black channel to identify a color/black boundary, and then removing a portion of the colored ink near the boundary.

In U.S. Pat. No. 7,173,734, Klassen, et al. disclose a way for intercolor bleed reduction in liquid ink printers which uses an edge detection operation to find edges in the image and determines a reduction factor for edge pixels based on the ink coverage level.

Many modern inkjet printers now have the ability to perform basic image processing operations inside the printer, either using a small CPU or a dedicated hardware ASIC to perform the image processing. As such, the image processing is not required to be performed on the host PC attached to the printer, and the host PC driver can simply send the source image data directly to the printer (usually in an RGB data format) for processing and printing. However, the printer ASIC typically does not contain an algorithm for applying intercolor bleed control, and the CPUs typically used in inkjet printers often do no have sufficient processing power to implement such an algorithm in software. Therefore, there is a need for an algorithm to control intercolor bleed that can be run in a host PC driver, and can operate on a source image in RGB color space.

SUMMARY OF THE INVENTION

It is an object of the present invention to reduce bleed artifacts in ink jet printers. It is a further object of the present invention to do this in a computationally efficient manner that can be readily adjusted to account for differences in ink, media and printer characteristics. It is another object of the present invention to modify RGB source image data to provide for intercolor bleed control. It is yet another object of the present invention that the bleed artifacts are variably corrected according to the mixture of ink colors printed on the page.

These objects are achieved by a method for modifying an input digital image having three color channels, each color channel having an (x,y) array of pixel values, to form a modified digital image suitable for use by an inkjet printer using colored and black inks to form a printed image having reduced ink bleed artifacts comprising:

a) computing a transformed digital image responsive to the input digital image, wherein the transformed digital image contains at least a black color channel and a color dependent scale factor channel;

b) computing a filtered black color channel from the black color channel using a convolution operation; and c) forming the modified digital image by modifying pixel values in the input digital image in response to the corresponding pixel values of the color dependent scale factor channel and the filtered black color channel, so that when the modified digital image is used to produce a printed image on an inkjet printer there are reduced ink bleed artifacts.

This invention has the advantage that it reduces objectionable bleed artifacts associated with ink jet printers in a computationally simple and efficient manner.

It has the additional advantage that the method uses a tunable configuration that can be optimized for different ink/media characteristics.

Another advantage is that the magnitude of correction is adaptively adjusted according to the amount of ink used at the boundary between a black and colored region in order to avoid the appearance of halo artifacts.

Yet another advantage is that the magnitude of correction is adaptively adjusted according to the color of the ink mixture used at the boundary between a black and colored region, thereby minimizing bleed and halo artifacts over the entire color range.

Still another advantage is that the invention is suitable for implementation in a PC host driver, where the source image data is stored in an RGB color space.

DETAILED DESCRIPTION OF THE INVENTION

Figure 12:
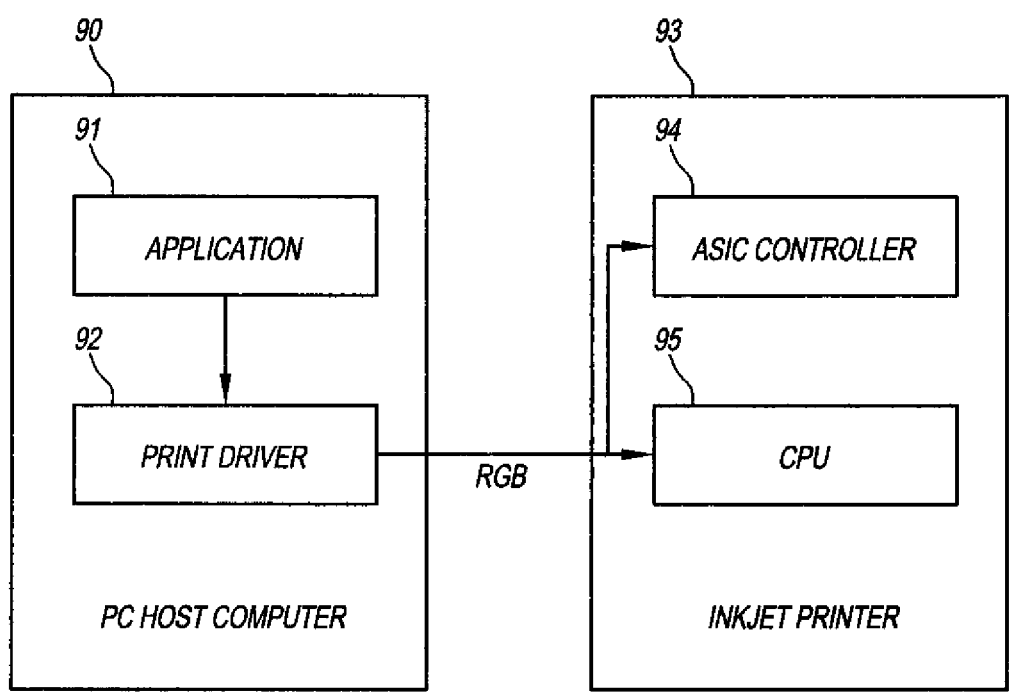
FIG. 12 is a flowchart illustrating a printing system in which the present invention applies.

A printing system in which the present invention applies is shown in FIG. 12. In this figure, a host personal computer (PC) 90 is shown with an application 91 and a print driver 92. The application can be any program that runs on the computer from which a user would wish to make a print on a printer. When the user requests a print to be made, the application 91 sends a print job to the print driver 92, which performs some image processing steps to create an ROB print data stream. The image processing steps typically performed in the print driver 92 will be known to those skilled in the art, and are beyond the scope of this discussion, except to note that the image data transmitted between the host PC 90 and an inkjet printer 93 is formatted in an RGB color space, meaning that each sampled pixel in the digital image data contains information pertaining to Red (R), Green (G), and Blue (B) colorants, which are typically used for displaying information on a computer screen. The RGB print data stream is then sent to the inkjet printer 93, which typically contains an ASIC controller 94 and a CPU 95, both of which can perform image processing tasks required to convert the RGB data stream into a format that can be used to control the ejection of the ink drops onto a sheet of paper using an inkjet printhead. One of the image processing steps that must be performed in the inkjet printer is a color conversion to convert the RGB print data to the correct combinations of the printer's inks (typically Cyan (C), Magenta (M), Yellow (Y), and Black (K)) to produce the desired color.

The present invention will now be described with reference to the flow diagram given in FIG. 5, the processing of which is preferably implemented inside the print driver 92 of FIG. 12. An input digital image 50, which is typically represented by red, green, and blue color channels (hereinafter referred to as "RGB" or "RGB color space"), is processed by a color transform operation 58 to produce a black color channel 51 corresponding to a black colorant, and one or more additional color channels 52 corresponding to additional colorants, each channel having an (x,y) array of pixel values. In ink jet printers, such colorants are referred to as inks, and the additional color channels are typically C, M, and Y, but can represent other ink colors as well. The black color channel 51 is processed using a convolution operation 53 to form a filtered black color channel 54 having filtered black image pixel values. A form color dependent scale factor channel step 59 is used to process the additional color channels 52 to form a color dependent scale factor channel 60 having color dependent scale factor image pixel values. A form modified additional color channels step 55 is then used to modify one or more of the additional color channels 52 in response to the filtered black color channel 54 and the color dependent scale factor channel 60 to form a set of modified additional color channels 56. The original black color channel 51, together with the modified additional color channels 56 are then processed by an inverse color transform operation 82 to produce a modified digital image 57, the modified digital image 57 having modified image pixel values being suitable for producing a printed image having reduced ink bleed artifacts on an inkjet printer. Each of the steps in the process described above will now be discussed in more detail.

Figure 3A:
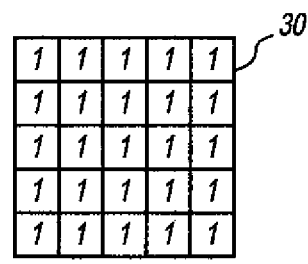
FIG. 3A shows a prior art typical low-pass convolution filter.
Figure 5:
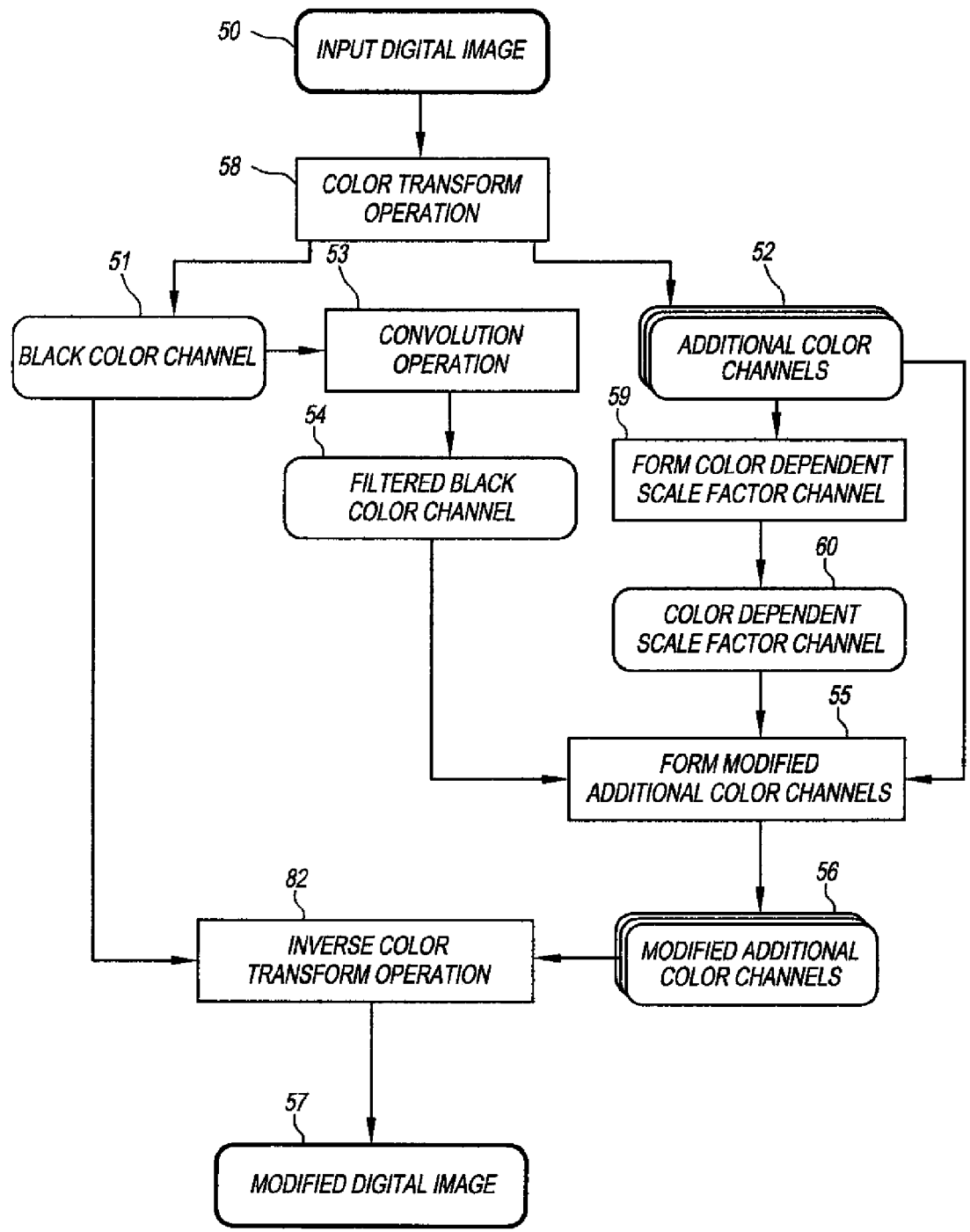
FIG. 5 is a flowchart illustrating the method of the present invention.

Referring to FIG. 5, the processing of the black color channel 51 will now be discussed. The black color channel 51 is processed by a convolution operation 53 to produce a filtered black color channel 54 having filtered black image pixel values. The purpose of this processing is to determine the proximity of a given pixel to a black edge in the image. Pixels closer to a black edge will be more likely to bleed with the black ink, and therefore the amount of ink that is removed from these pixels will be a function of the proximity of a given pixel to a black edge. The filter used in the convolution operation 53 can take a variety of forms within the scope of the invention, including low-pass and hi-pass convolution filters. A conventional low-pass convolution filter 30 is shown in FIG. 3A. In this example, the filter is a 5×5 "box filter." (A "box filter" is a simple filter where all of the filter coefficients are the same.)

Convolution operations are well known in the art, and in accordance with the present invention include calculations where a neighborhood of pixels around a center pixel are weighted by a matrix of filter coefficients to determine a filtered pixel value, or mathematical equivalents thereof. As will be understood by one skilled in the art, the convolution operation 53 normalizes the convolution filter 30 so that the coefficients sum to unity, ensuring that the range of the filtered black color channel 54 matches the range of the black color channel 51.

Figure 1A:
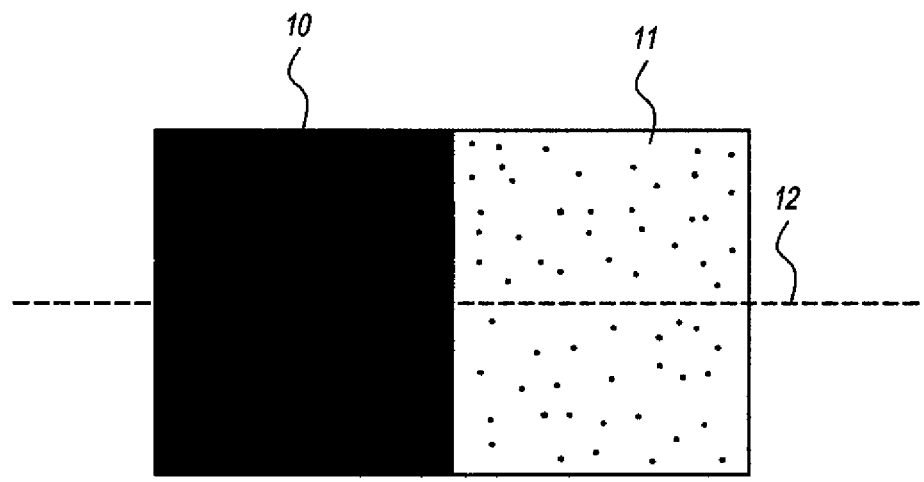
FIG. 1A illustrates a boundary between black and colored ink patches.
Figure 1B:
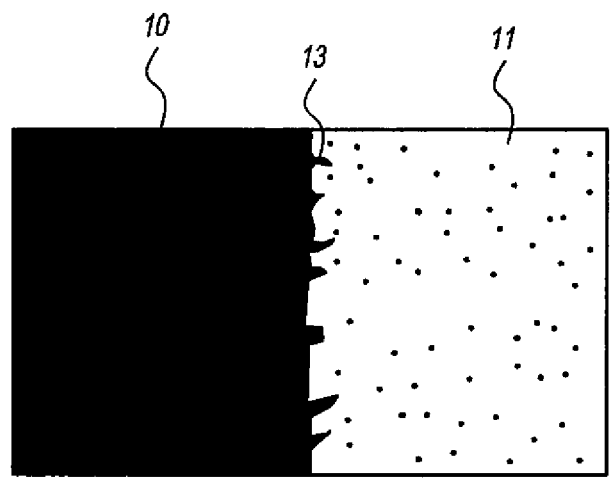
FIG. 1B illustrates the appearance of ink bleed artifacts.
Figure 2A:
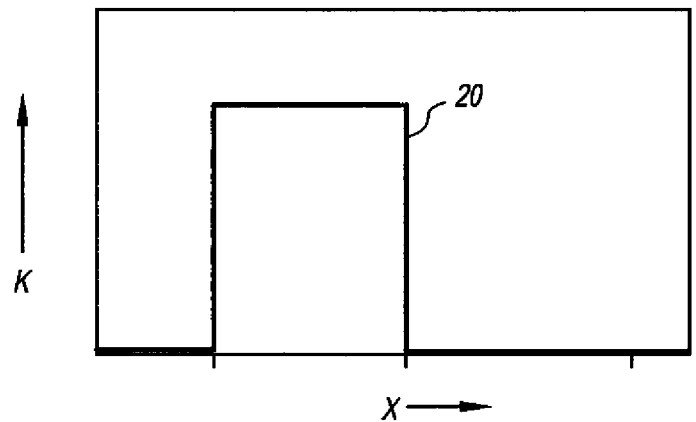
FIG. 2A shows a black input image cross-section.
Figure 2B:
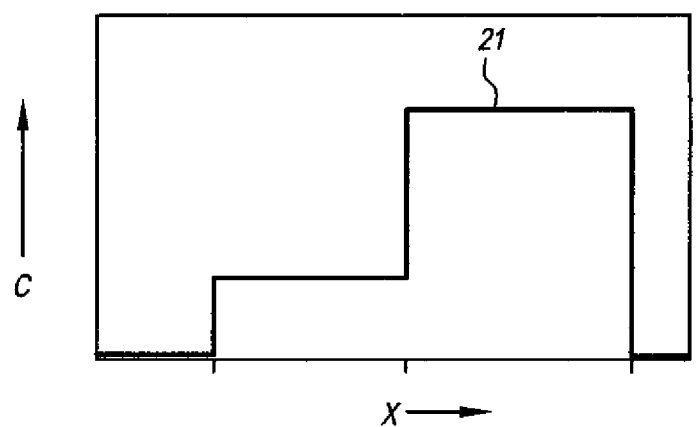
FIG. 2B shows a colored input image cross-section.
Figure 3B:
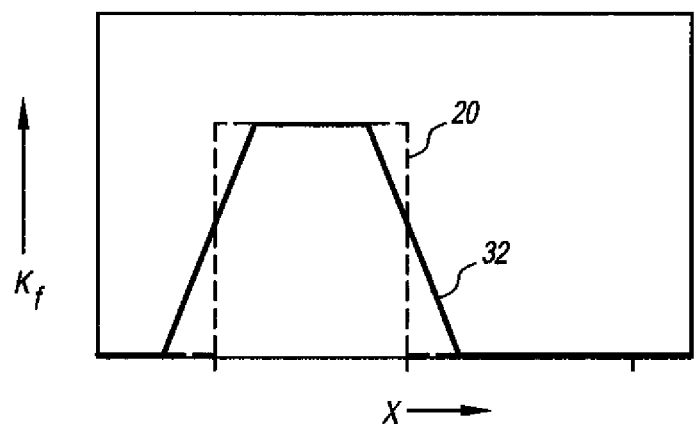
FIG. 3B shows a low-pass filtered black image cross-section.

Consider now the example image shown in FIG. 1A. Cross-sections through the image regions at the cross-section line 12 are shown in FIG. 2A and FIG. 2B. In this example, the first region 10 is a black patch comprised of a high-level of black ink, together with a lesser amount of cyan ink, and the second region 11 is a cyan patch comprised of a high-level of cyan ink, with no other inks. FIG. 2A illustrates the black input image cross-section 20, giving the image pixel values K for the black input color channel of the input digital image as a function of the position coordinate x. It can be seen that for the range of x values corresponding to the first region 10 the K values are large, and for the range of x values corresponding to the second region 11, the K values are zero. FIG. 2B illustrates the cyan input image cross-section 21, giving the image pixel values C for the cyan input color channel of the input digital image as a function of the position coordinate x. It can be seen that for the range of x values corresponding to the second region 11 the C values are large, and for the range of x values corresponding to the first region 10, the C values are smaller, but non-zero. Processing the black color channel of the example image with a low-pass convolution filter results in a filtered black color channel 54 having filtered black image pixel values where the black edges have been "blurred out" and broadened as shown in FIG. 3B. The broadening of the edge means that the magnitude of the filtered black color channel 54 can be used as an indicator of the proximity of a given pixel to an edge. Low values of the filtered black color channel 54 indicate that the given pixel is either far from a black edge, or near to a black edge of lower magnitude. In either case, the amount of bleed correction required is relatively small. Conversely, high values of the filtered black color channel 54 indicate that a given pixel is close to a strong black edge, and therefore a large amount of bleed correction would be required.

Figure 4A:
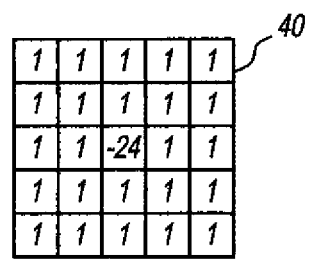
FIG. 4A shows a prior art typical hi-pass convolution filter.
Figure 4B:
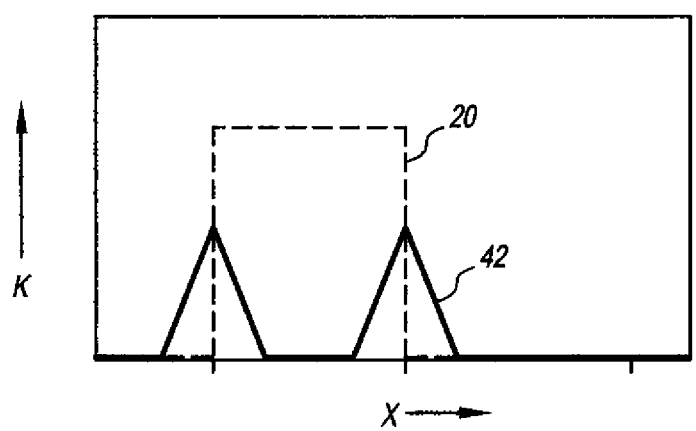
FIG. 4B shows a hi-pass filtered black image cross-section.

The embodiment that was described hereinabove represents just one possible implementation of the convolution operation 53. There are many possible variations of this invention that will be obvious to one skilled in the art. For example, it can be desirable to reduce the amount of ink in the additional color channels near the edge of the boundary region where bleed is likely to occur, but to leave it unchanged in image regions away from the boundary region. Note that the value of the filtered black color channel $K_f$ is large for interior portions of the example image as shown in FIG. 3B, indicating that any colored ink that exists in the interior portion would be removed. This may not be desirable in all cases, since removing the colored ink from the first region 10 may result in an undesirable color shift. One way to prevent this in accordance with a preferred embodiment of the present invention is to use a different type of convolution filter, such as a conventional hi-pass convolution filter 40 as shown in FIG. 4A. A convolution operation that includes filtering the black color channel 51 using the hi-pass convolution filter followed by applying an absolute value operation can be also used to determine a given pixel's proximity to a black edge. An absolute value operation is a well known mathematical operator that returns the magnitude of its argument as a positive quantity. Applying the hi-pass convolution of FIG. 4A to the black channel of the example image results in the hi-pass filtered black image cross-section 42 as shown in FIG. 4B. The original black input image cross-section 20 is shown again for comparison. It can be seen that the effect of applying the hi-pass convolution filter 40 is basically to identify image regions near edges in the black color channel, and that the value of the filtered black color channel is low for interior portions of the first region 10, indicating that no modification of the additional color channels is desired. Once the filtered black color channel 54 is computed according to the processes described above, it is passed to the form modified input color channels step 55, the details of which will be discussed later in this document.

Referring back to FIG. 5, the processing of the additional color channels 52 will now be discussed. The form color dependent scale factor channel step 59 is used to generate the color dependent scale factor channel 60 having color dependent scale factor image pixel values in response to the additional color channels 52. The color dependent scale factor channel 60 is used (in addition to the filtered black color channel 54) to reduce the amount of ink that is present to control bleed artifacts, based on how much total ink is present, and what specific color the ink mixture represents. The generation and usage of the color dependent scale factor channel 60 will be discussed in detail hereinbelow.

Figure 6:
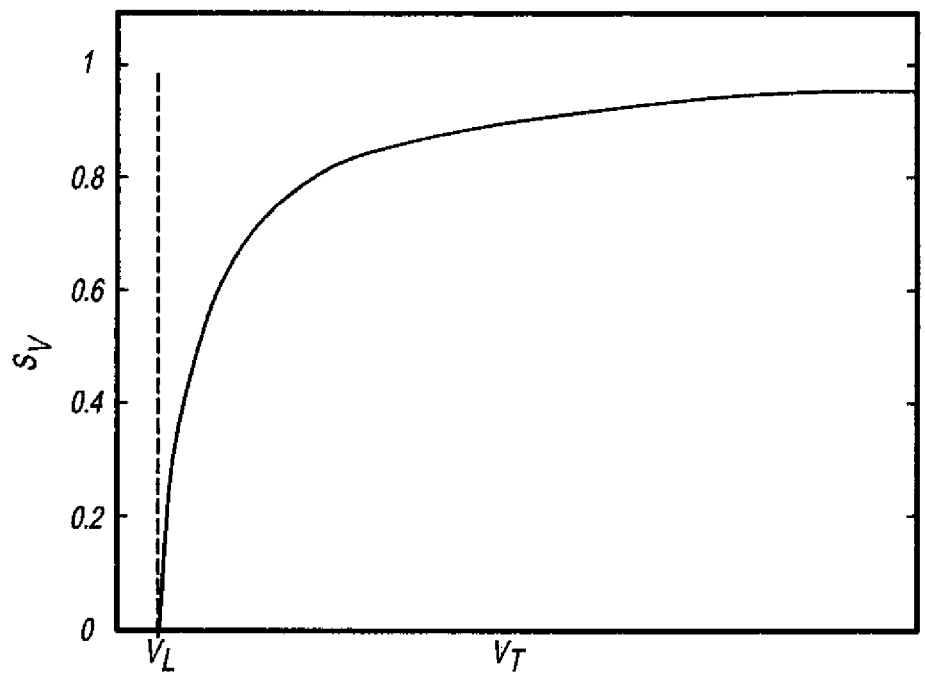
FIG. 6 is a plot of a typical volume tapering function.
Figures 9, 10:
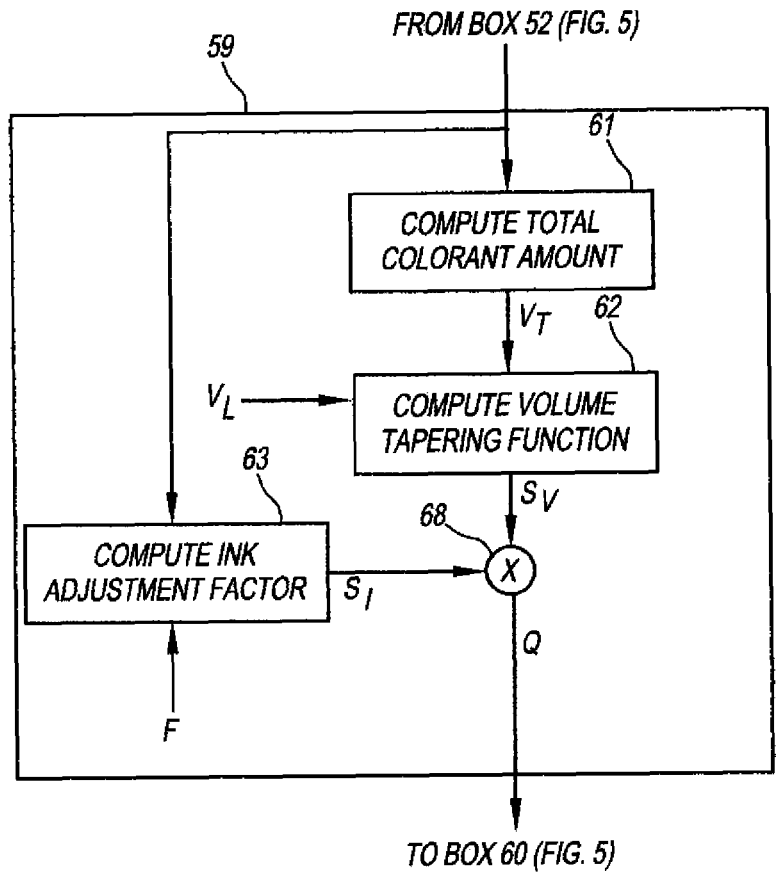
FIG. 9 is a flowchart illustrating an embodiment of the form color dependent scale factor channel step.
FIG. 10 is a table showing ink adjustment factor data.

Referring to FIG. 9, the details of the form color dependent scale factor channel step 59 of FIG. 5 are shown. In this arrangement, it is desired to limit the total ink fluid amount, or ink colorant amount, of the modified additional color channels 56 to be less than or equal to a total colorant amount limit $V_L$ for pixels near a black edge. As discussed earlier, the filtered black color channel 54 is used to determine the proximity of a given pixel to a black edge, and the processing of the additional color channels dictates how much ink will be removed for pixels adjacent to the edge. The total colorant amount limit $V_L$ is determined experimentally for a given ink and media combination, and set to a value that substantially prevents ink bleed artifacts from occurring for most colors. In many cases, it is not necessary to remove all of the colored ink next to a black edge to significantly reduce ink bleed artifacts, and as such the value of $V_L$ will generally be >0. A total colorant amount, $V_T$, is computed for a given pixel of the image by summing the colorant amounts for the one or more additional color channels according to a compute total colorant amount step 61. A volume tapering function $S_V(V_T)$ is then computed using a compute volume tapering function step 62 according to:

$$S_V(V_T) = \text{Clip}(1 - V_L/V_T, 0, 1) \quad (1)$$

where $V_L$ is the predetermined colorant amount limit described above, and Clip(A,min,max) is a function that clips the value of the argument A to the range between min and max. Thus, the volume tapering function $S_V(V_T)$ indicates how much colorant should be removed from a given pixel to satisfy the colorant amount limit, $V_L$. A plot of the volume tapering function $S_V(V_T)$ is shown in FIG. 6. Note from the plot of FIG. 6 that when $V_T < V_L$, the total colorant amount limit is already satisfied and the value of the volume tapering function $S_V(V_T)$ is 0, indicating that no colorant needs to be removed from the pixel. When $V_T > V_L$, the value of the volume tapering function $S_V(V_T)$ increases proportionally, indicating the fraction of the total colorant amount $V_T$ that is required to be removed to satisfy the colorant amount limit $V_L$. The volume tapering function as described above specifies a "nominal" correction to be applied for a pixel adjacent to a black edge. This nominal correction is modified (reduced) with increasing distance from the black edge (as determined by the filtered black color channel discussed earlier), and is further modified depending on the specific mixture of ink colors that is present at the pixel, as will be discussed next.

Referring again to FIG. 9, a compute ink adjustment factor step 63 is used to compute an ink adjustment factor $S_I$ from the pixel values of the additional color channels and ink adjustment data F. In one embodiment of the present invention, the ink adjustment data F includes a multidimensional look-up table of values corresponding to the possible combinations of the additional inks, where the table value specifies an ink adjustment factor corresponding to the given ink combination. For example, if the additional color channels are C, M, and Y, then the ink adjustment data F includes a $2^3$ table of ink adjustment values. An example table is shown in FIG. 10. In this example table, the ink adjustment value for Y, M, and R (=M+Y) is >1, indicating that these ink combinations bleed more severely with the black ink. Conversely, the ink adjustment values for C and G(=C+Y) are <1, indicating that these ink combinations bleed less severely. The ink adjustment value for B (=C+M) is equal to 1, indicating that no "fine adjustment" is required for this combination over the nominal correction amount. The ink adjustment factor $S_I$ for the given input color is determined from the ink adjustment table using tetrahedral interpolation based on the digital code values of the additional color channels. One skilled in the art will understand the concept of tetrahedral interpolation of a multidimensional look-up table, and that other interpolation techniques could be used as well within the scope of the invention. One skilled in the art will appreciate that a multidimensional look-up table can be stored as a set of discrete nodes that can be interpolated using a number of well known methods, and that it is also possible within the scope of the present invention to compute the ink adjustment factor $S_I$ using a variety of other mathematical techniques, including polynomial models and the like.

Still referring to FIG. 9, the ink adjustment factor $S_I$ is then multiplied by the volume tapering function $S_V(V_T)$ using a multiplier 68 to produce the color dependent scale factor (Q) according to:

$$Q = \text{Clip}(S_I \times S_V(V_T), 0, 1) \quad (2)$$

As discussed earlier, the volume tapering function $S_V(V_T)$ supplies a nominal amount of correction based on the total volume of ink present and the colorant amount limit, $V_L$, and the ink adjustment factor $S_I$ supplies a "fine adjustment" of the amount of correction based on the color of the ink mixture that is present. This provides for a large degree of flexibility, and the ability to specifically tune the amount of bleed artifact correction for each printable color.

Returning to FIG. 5, the form modified input color channels step 55 is used to modify the input digital image 50 in response to the filtered black color channel 54 and the color dependent scale factor channel 60 to form a set of modified digital image 57 having modified image pixel values. The details of this process will now be described hereinbelow.

Removing the amount of colorant specified by the volume tapering function $S_V(V_T)$ will result in the prevention of bleed artifacts for pixels immediately adjacent to a black edge, but pixels farther away from the edge are less susceptible to bleeding, and do not require as much colorant to be removed. Thus, an edge tapering function, $S_E(K_f)$, is employed to reduce the amount of colorant that is removed for pixels that are farther from the black edge, as described below.

Figure 7:
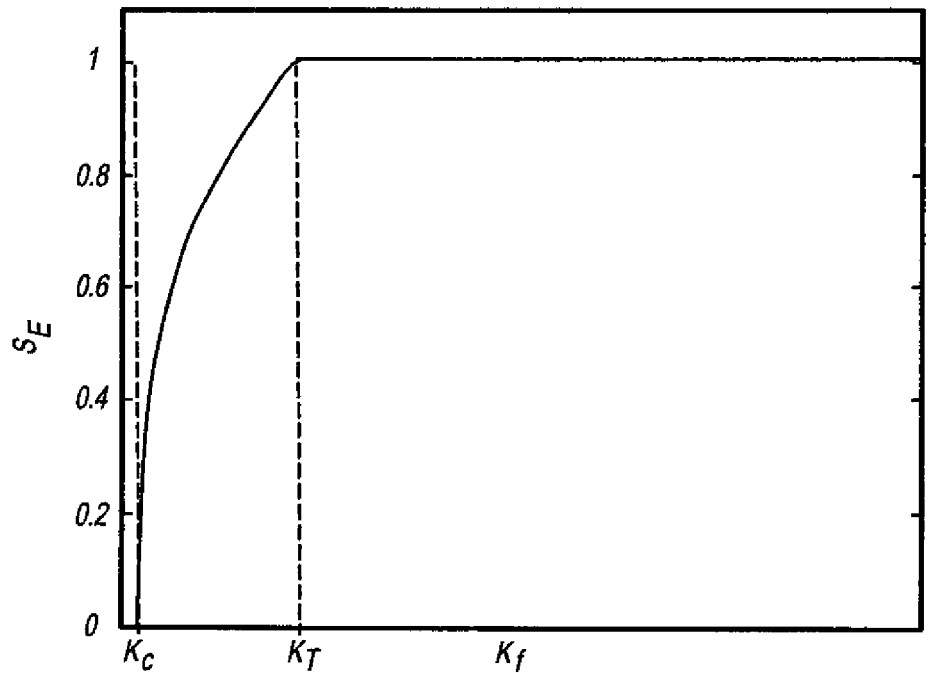
FIG. 7 is a plot of a typical edge tapering function.
Figure 8:
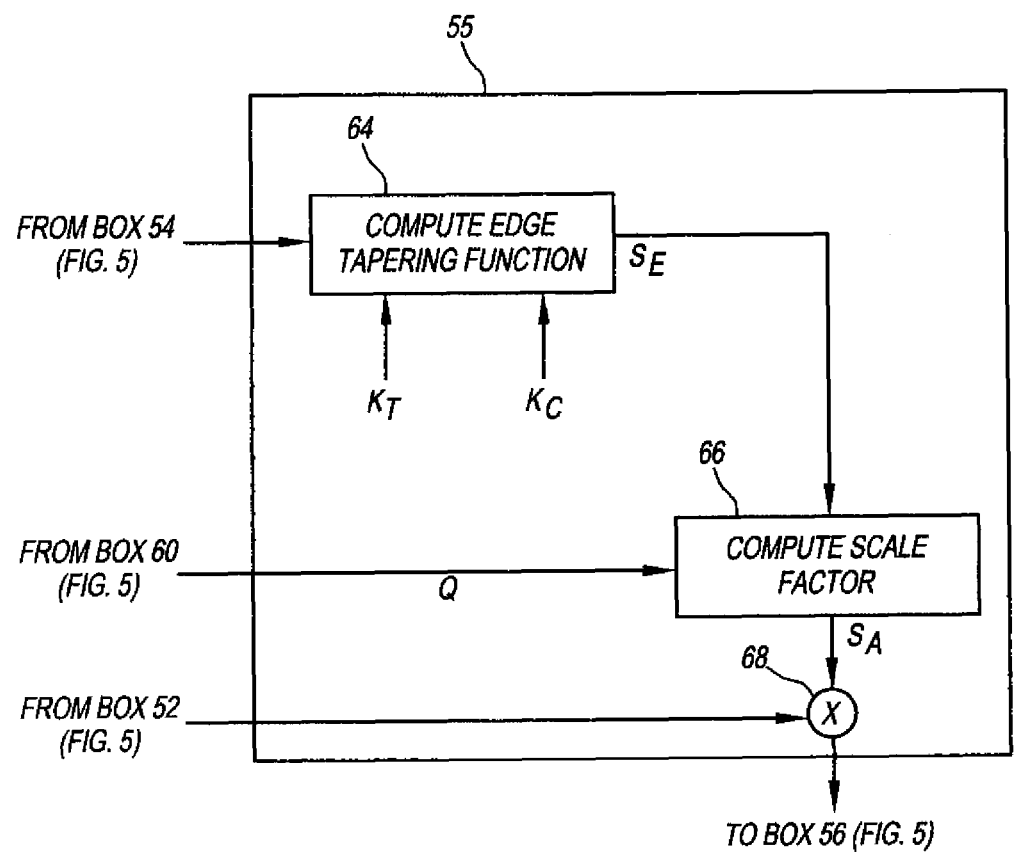
FIG. 8 is a flowchart illustrating an embodiment of the form modified additional color channels step.

Referring to FIG. 8, the details of the form modified additional color channels step 55 of FIG. 5 according to one embodiment will now be discussed. In this arrangement, the bleed control aspects of the edge tapering function and the color dependent scale factor channel 60 are combined and applied to the additional color channels 52 to produce the modified additional color channels 56. The edge tapering function ($S_E$) is computed using a compute edge tapering function step 64 according to:

$$S_E(K_f) = \left(\frac{K_f - K_c}{K_T - K_c}\right)^p \quad (3)$$

where $K_f$ is the filtered black image pixel value described above, p is an exponent that controls the shape of the edge tapering function, $K_T$ is a threshold parameter, and $K_c$ is a coring parameter. A plot of the edge tapering function, $S_E(K_f)$ is shown in FIG. 7. As can be seen from the plot, the threshold parameter $K_T$ sets the value of the filtered black image pixel at which it is required that the most ink be removed. Thus, the closer one gets to a black edge (or the magnitude of a black edge increases) the value of $K_f$ will increase, and it is desired to remove more ink. This is indicated by the generally increasing nature of the edge tapering function, $S_E(K_f)$. As can also be seen from the plot of FIG. 7, the coring parameter $K_c$ sets the point at which the edge tapering function $S_E(K_f)$ becomes non-zero. This parameter is used to prevent removing ink from the one or more additional color channels when the value of $K_f$ is very small. Small values of $K_f$ will indicate that the pixel is either far from a black edge, or the magnitude of the black edge is small. In these cases, it is not generally required to remove any ink to prevent bleed artifacts.

Referring back to FIG. 8, a compute scale factor step 66 is used to combine the behavior of the color dependent scale factor Q 60 and the edge tapering function $S_E(K_f)$ to produce the pixel-dependent scale factor for the additional color channels $S_A$, according to the following equation:

$$S_A = 1 - Q \times S_E(K_f) \quad (4)$$

The additional color channels 52 are then multiplied by the pixel-dependent scale factor $S_A$ using a multiplier 68 to form the modified additional color channels 56. The pixel dependent scale factor $S_A$ combines aspects of bleed control based on the proximity of a pixel to a black edge, the total amount of colorant present at the pixel relative to a colorant amount limit, and the specific mixture of ink colors present at the pixel to provide to a high degree of flexibility in tuning to prevent bleed artifacts across a wide range of colors and printing conditions.

Turning back to FIG. 5, the modified additional color channels 56 are then combined with the black color channel 51 and processed by the inverse color transform operation 82. The function of the inverse color transform operation 82 is to convert the modified values back to the RGB color space of the input digital image 50. This is necessary because the host PC can only transmit image data to the printer in an RGB color space. The inverse color transform operation 82 preferably implements a multidimensional lookup table to convert the modified additional color channels 56 and black color channel 51 back into RGB color space. Such techniques will be known to one skilled in the art. When the printer receives the modified digital image 57, the image processing algorithms implemented inside the printer will substantially replicate the color transform operation 58, except that the output of that operation will now substantially reproduce the modified additional color channels 56, which will result in reduced ink bleed artifacts.

Figure 11:
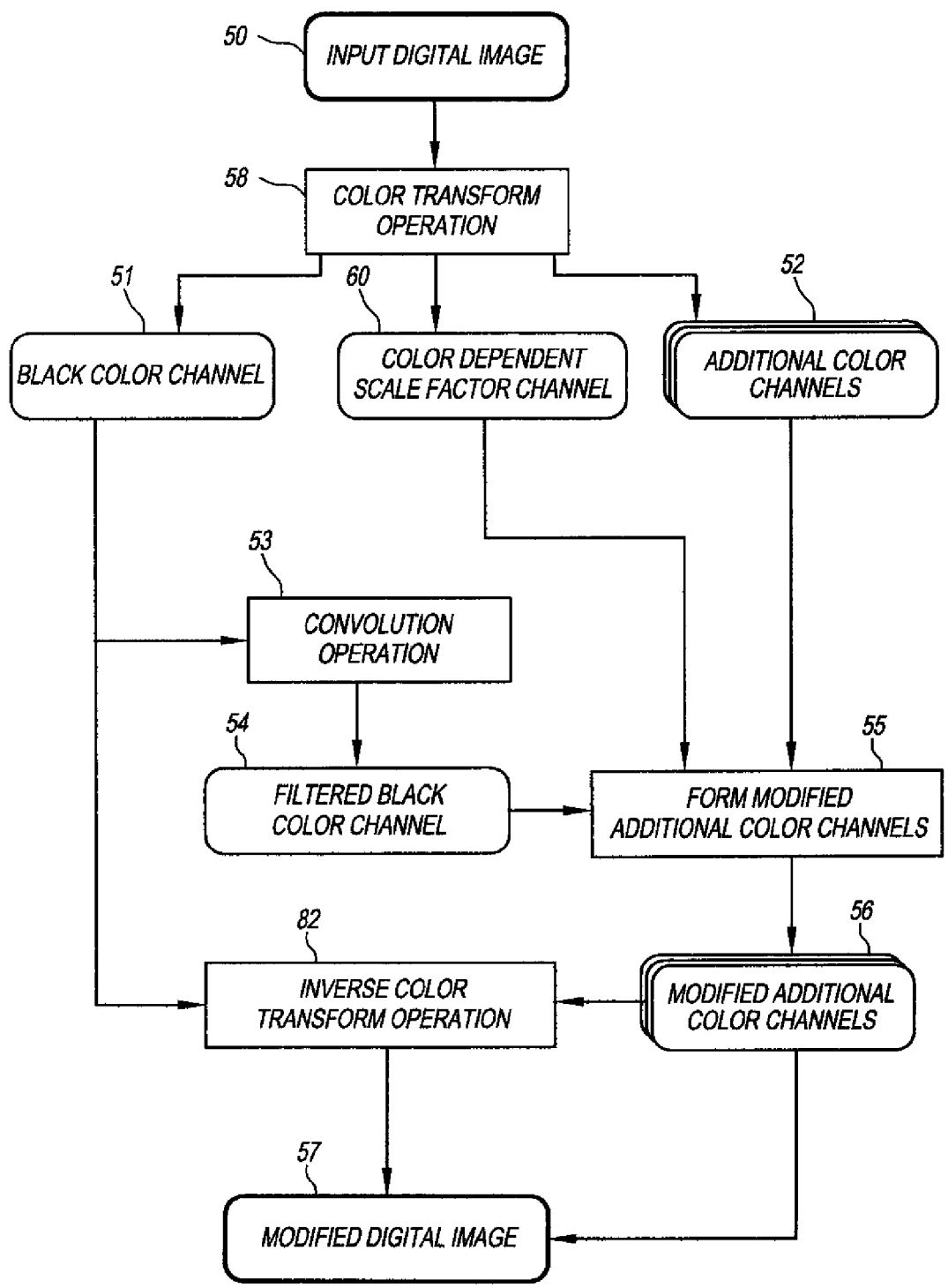
FIG. 11 is a flowchart illustrating another method of the present invention.

Turning now to FIG. 11, another embodiment of the present invention will be described. In this embodiment, the color transform operation 58 generates the black color channel 51, additional color channels 52, and the color dependent scale factor channel 60 directly. This arrangement is advantageous in that the color dependent scale factor channel 60 is pre-computed and stored as an additional channel of a multidimensional color table used in the color transform operation 58. This provides for an improvement in computational efficiency by reducing the number of calculations that are required to process the input digital image using the method of the present invention. This arrangement is possible since the only information required to generate the color dependent scale factor channel 60 is the digital code values of the additional color channels for the node points in the multidimensional color table, the total colorant amount $V_T$, the colorant amount limit $V_L$, and the ink adjustment data F. Since all of these parameters will be known to the system designer at the time that the multidimensional color table is created, then the color dependent scale factor 60 can be pre-computed and simply stored as an additional plane in the color table. The techniques of building and applying a multidimensional lookup table for use in the color transform operation 58 will be known to one skilled in the art.

Figure 13:
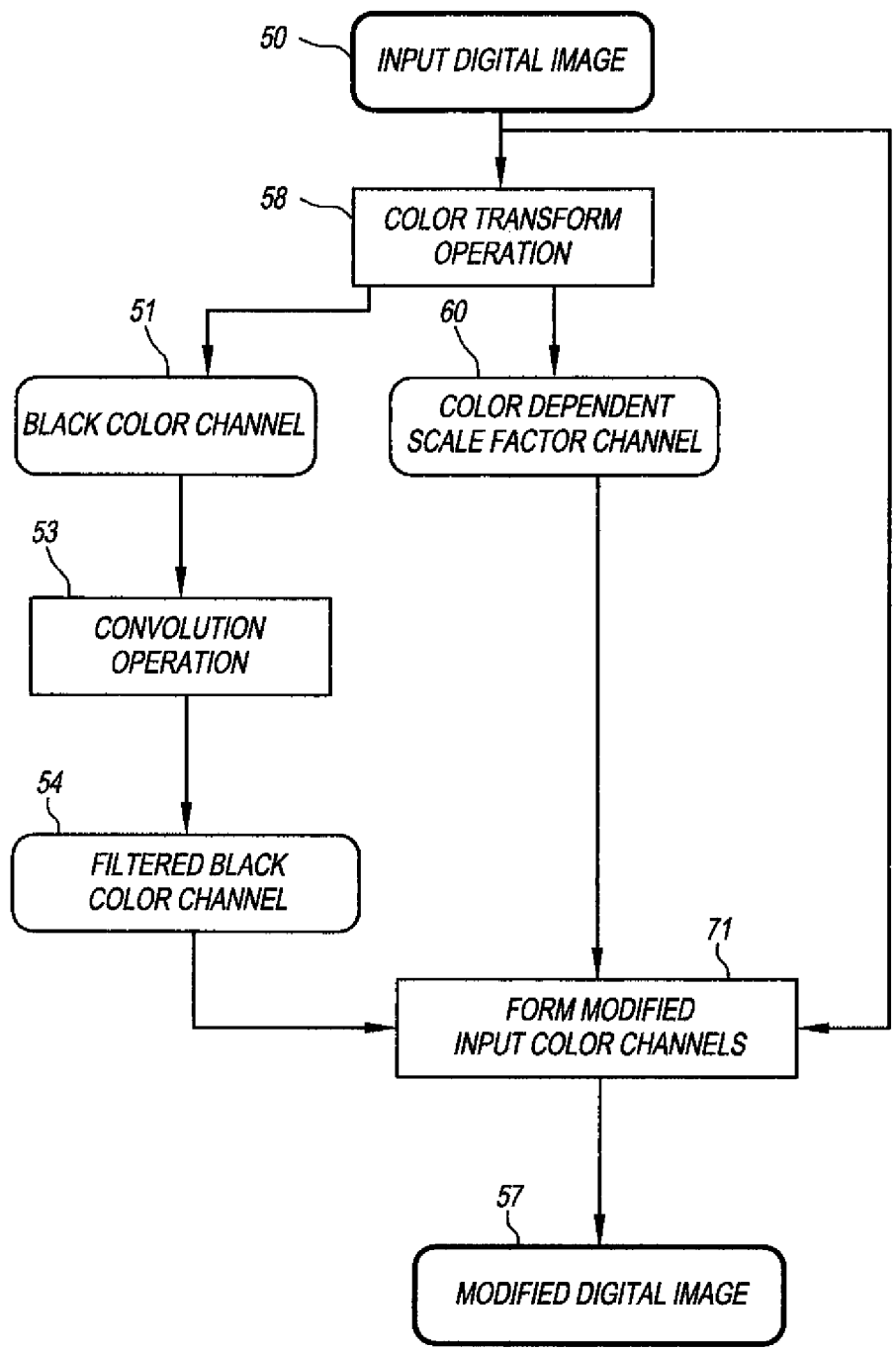
FIG. 13 is a flowchart illustrating another method of the present invention.

Turning now to FIG. 13, a preferred embodiment of the present invention will be described. In this embodiment, the color transform operation 58 produces the black color channel 51 and the color dependent scale factor channel 60 directly, thereby gaining all of the advantages of pre-computation as discussed above. However, note in this case that additional color channels corresponding to the colored inks are not computed by the color transform operation 58.

Computation of these color channels in this embodiment is not necessary, since they will be discarded and not transmitted to the printer. All of the information pertaining to the amount of colored ink present at each location in the image is contained in the color dependent scale factor channel 60. The black color channel 51 is processed in a similar fashion as to the embodiments described above, ultimately producing a filtered black color channel 54. Next, a form modified input color channels step 71 receives the RGB pixel values of the input digital image 50, the filtered black color channel 54, and the color dependent scale factor channel 60 to produce the modified digital image 57 such that intercolor bleed artifacts are reduced. The details of the form modified input color channels step 71 will now be discussed in detail.

Figure 14:
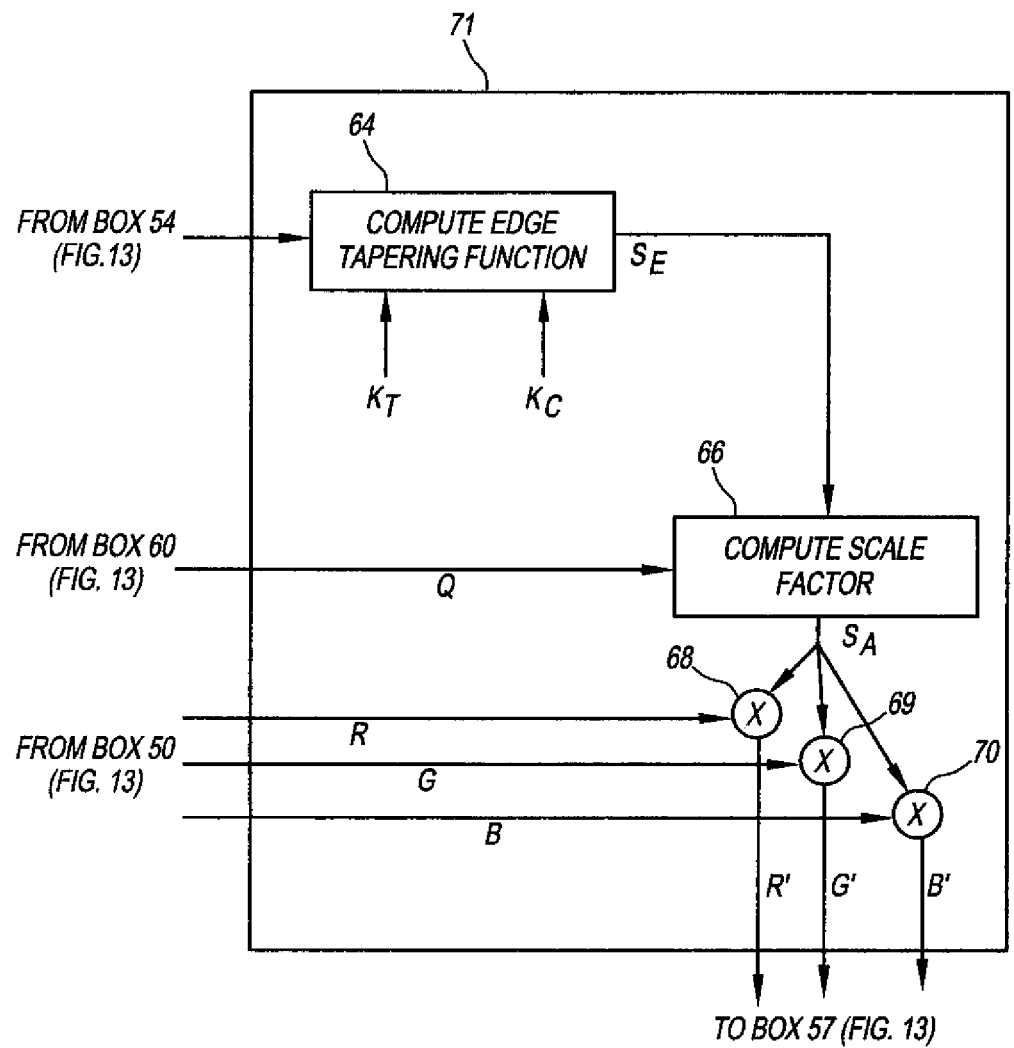
FIG. 14 is a flowchart illustrating an embodiment of the form modified input color channels step.

Turning to FIG. 14, the details of the form modified input color channels step 71 of FIG. 13 will now be discussed. The processing shown in FIG. 14 is identical to the processing described in FIG. 8, with the exception that the input RGB image data is modified by the multipliers 68, 69, 70 according to:

$$R' = R \times S_A$$

$$G' = G \times S_A$$

$$B' = B \times S_A \qquad (5)$$

where R', G', B' represent the modified image pixel values, $S_A$ is the pixel dependent scale factor, and R,G,B are the input image pixel values. Depending on the polarity of the RGB image signal, it may be necessary to invert the pixel values (by performing a 255-RGB in the case of an 8-bit image) prior to multiplying by the pixel dependent scale factor, followed by a subsequent inversion afterwards to compute the R'G'B' values, according to:

$$R' = 255 - [(255-R) \times S_A]$$

$$G' = 255 - [(255-G) \times S_A]$$

$$B' = 255 - [(255-B) \times S_A] \qquad (6)$$

Such "polarity inversion" will be known and obvious to one skilled in the art. According to the embodiments described above, the pixel dependent scale factor $S_A$ will cause less ink to be printed in image regions where intercolor bleed is likely to occur, based on the amount of colored ink present at the given pixel, and the pixel's proximity to a black edge. Note, as mentioned earlier, that due to the "inverse" polarity of the RGB color space relative to the CMYK color space of the printer, that printing less ink is generally achieved by increasing the RGB code values. This will be obvious to one skilled in the art, and will typically require an inversion of the data polarity as described above.

An important aspect of the present invention that provides for a significant improvement over the prior art will now be described. Assume a pixel in the input digital image has an RGB color of (R,G,B)=(0,0,128), which for a particular printer corresponds to a CMYK color of (C,M,Y,K)=(212, 206,0,136) according to the color transform for the given printer. (Note that this particular combination of CMYK will be appropriate for a given printer, but that the combination may be different for a different printer, depending on the colorants used by the printer). Now assume that it is desired to remove 20% of the ink to prevent intercolor bleed of this color with a neighboring pixel. In CMYK color space, this can be achieved by simply scaling the CMYK code values by 0.8, due to the generally linear relationship between CMYK code values and ink amount. This would result in desired CMYK code values of (170,165,0,109). However, the same scaling by 0.8 cannot be applied in the RGB color space, due to the generally nonlinear relationship between RGB code value and ink amount. Assume that applying the inverse color transform 82 to the desired CMYK code values of (170,165,0,109) results in desired RGB code values of R'G'B'=(116,73,226). Substituting EQ. 4 into EQ. 6, and assuming that the pixel in question is immediately adjacent to a black edge (such that the value of edge tapering function $S_E(K_f)$ is 1), we obtain:

$$R' = 255 - [(255-R)(1-Q)]$$

$$G' = 255 - [(255-G)(1-Q)]$$

$$B' = 255 - [(255-B)(1-Q)] \qquad (7)$$

Now, allowing for the value of Q to be unique for each of R, G, and B, we solve the equation above to find:

$$Q_R = 1 - (255-R')/(255-R) = 1 - (255-116)/(255-0) = 0.46$$

$$Q_G = 1 - (255-G')/(255-G) = 1 - (255-73)/(255-0) = 0.29$$

$$Q_B = 1 - (255-B')/(255-B) = 1 - (255-226)/(255-128) = 0.77 \qquad (8)$$

where $Q_R$, $Q_G$, and $Q_B$ are the desired color dependent scale factors that would be used for R, G, and B respectively to achieve the desired RGB values. However, the compute scale factor step 66 of FIG. 14 uses only a single color dependent scale factor Q to produce a single pixel dependent scale factor $S_A$ that is used for R, G, and B. In this case, the average value of $Q_R$, $Q_G$, and $Q_B$ can be used according to:

$$Q = \frac{(Q_R + Q_G + Q_B)}{3} \qquad (9)$$

Note however, that this will not result in the precise amount of ink being removed. Another way to compute an optimal single value for the color dependent scale factor Q is to iteratively search for a value of Q that results in modified image pixel values R', G', and B' that correspond to CMYK ink amounts that most closely match the desired CMYK ink amounts. There are many such criteria for determining the closest match that are possible within the scope of the present invention, including minimum color error in a CIELab color space, minimum squared error of the CMYK code values, and others that will be known to one skilled in the art. Performing such a computation is only required when the color transform used in the color transform operation 58 of FIG. 13 is being created, and therefore the amount of processing time required to achieve the optimal color dependent scale factor Q for each RGB value in the color transform is not important. Performing the iterative search using the RGB values of (0,0,128) and the desired CMYK code values of (170,165,0,109) using a minimum squared error metric produces a Q value of 0.31, resulting in modified image pixel values of R'G'B'=(80,80, 168) and corresponding CMYK code values of (171, 158, 0, 110). The optimal value of Q is then computed for each RGB triplet in the multidimensional look-up table color transform, and stored in the multidimensional look-up table as the color dependent scale factor plane.

Figure 15:
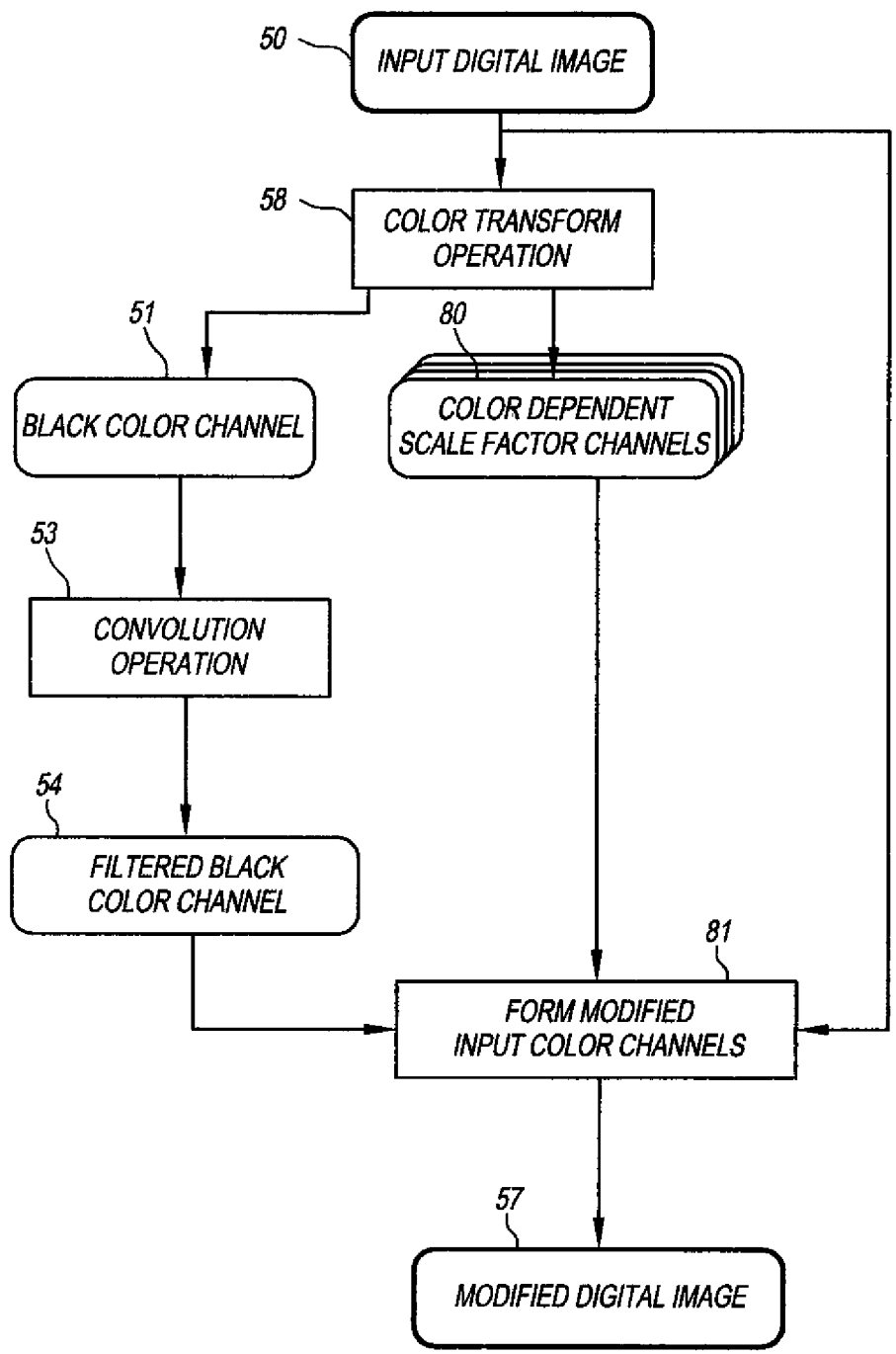
FIG. 15 is a flowchart illustrating another method of the present invention.
Figure 16:
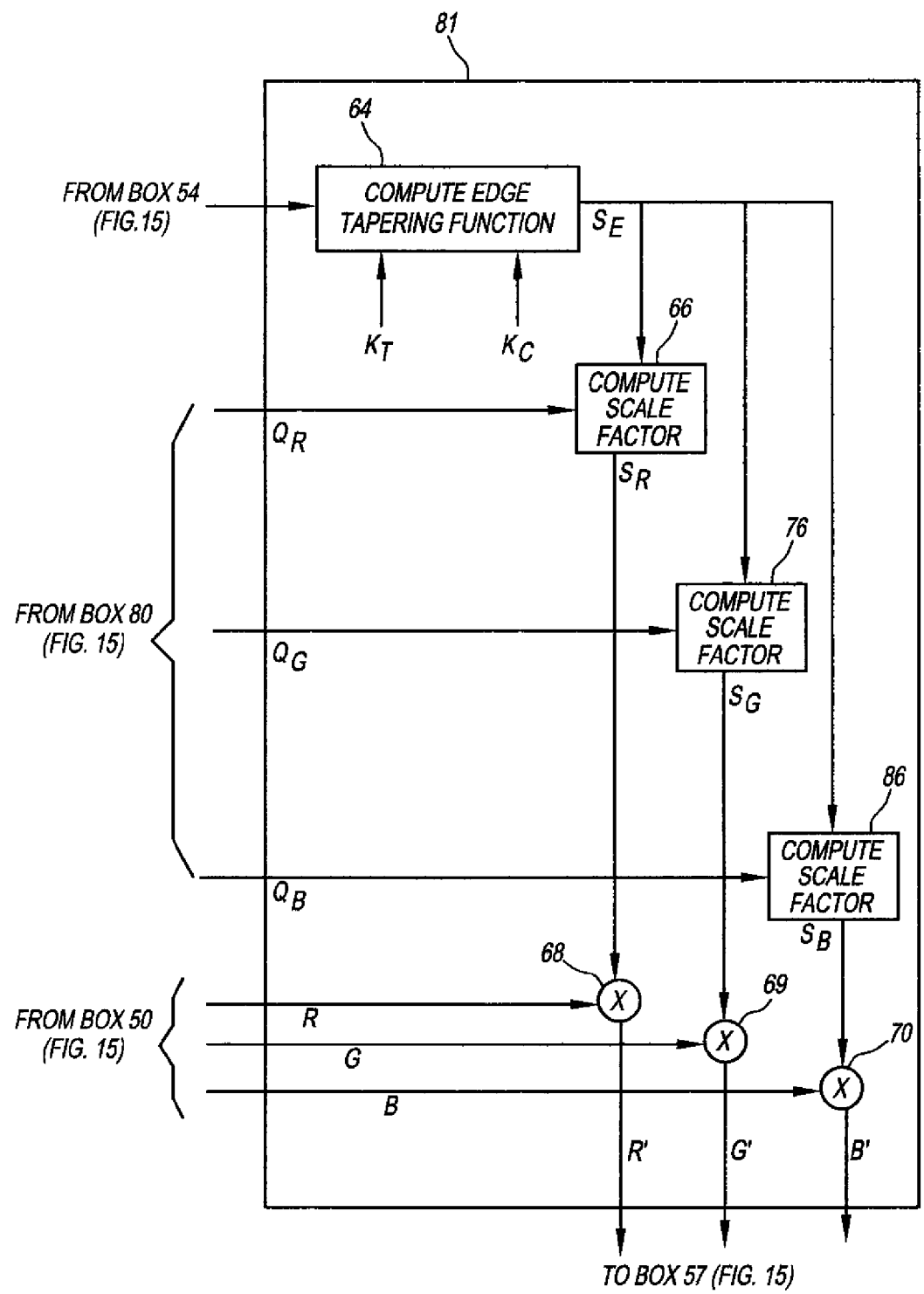
FIG. 16 is a flowchart illustrating another embodiment of the form modified input color channels step.

In many situations, using a single value for the color dependent scale factor Q will provide for adequate image quality, however to achieve the best image quality, a separate color dependent scale factor for each of R, G, and B is required. Thus, in another embodiment of the present invention, shown in FIG. 15, the color transform operation 58 creates three color dependent scale factor channels 80, each corresponding to one of the R, G, or B color channels of the input digital image. In this case, the color dependent scale factor channels 80 would store the value of the color dependent scale factor channel for each color channel ($Q_R$, $Q_G$, $Q_B$) that would be required to modify the input RGB pixel values to produce the desired ink amounts, as described above. A form modified input color channels step 81 is then used to modify the input pixel values according to the filtered black color channel 54 and the color dependent scale factor channels 80. The details of the form modified input color channels step 81 are shown in FIG. 16. As shown in FIG. 16, the color dependent scale factors $Q_R$, $Q_G$, $Q_B$ are processed by compute scale factor steps 66, 76, 86 to produce pixel dependent scale factors $S_R$, $S_G$, $S_B$, which are used by multipliers 68, 69, 70 to produce the modified image pixel values. This would result in precisely the desired amount of ink being printed to produce a high quality image with reduced intercolor bleed artifacts.

There are many other variations of the present invention that can be applied by one skilled in the art. For example, experiments suggest that the severity of the bleed artifact correlates well with the total volume of ink present at the color/black ink boundary. Therefore, the total colorant amount $V_T$ can be calibrated using a calibration function such that it is linearly related to the total ink volume. This can be accomplished by a simple conversion between the pixel value of a given color channel to ink volume using some basic parameters of the printing system, such as the ink drop volume for each color ink, and the number of ink drops placed at each location. Such a conversion will be obvious to one skilled in the art.

Additionally, the method of the present invention can be employed to provide for modifying the black color channel in addition to the additional color channels. This can be accomplished by filtering the additional color channels using one of the filtering techniques described above. The filtered color channels can then be combined to form a second filtered color channel by summing the values of the filtered color channels. Another way to combine the filtered color channels would be to set the second filtered color channel value to the largest of the individual filtered color channel values. Then, in a similar fashion to the method described above, the second filtered color channel can be used to modify the black color channel using similar functions for the volume taper and edge taper functions described above.

In some applications, it can be advantageous to apply the method of the present invention to only certain regions of a document. For example, in a compound document containing text, graphics, and bitmap regions (i.e., digitized pictures), a time savings can be realized by applying the method of the present invention to only regions of the document containing text, graphics or both. An automatic detection algorithm can be used to segment the text, graphics, and bitmap portions of the document, and the detection signal used to control the processing such that the present invention is applied only to the text and graphics portions.

The embodiments of the present invention described above discuss computing scale factors or functions using a functional relationship having inputs including the corresponding image pixel values of the one or more additional input color channels and the image pixel value of the filtered black color channel. As will be understood by one skilled in the art, processing performance improvement can be achieved by precomputing such functional relationships and storing the result in one or more look-up table(s) (LUTs). The look-up tables can be addressed using the input values to determine the corresponding output values.

The invention has been described in detail with particular reference to certain preferred embodiments thereof, but it will be understood that variations and modifications can be effected within the spirit and scope of the invention.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

Parts List 10 first region
11 second region
12 cross-section line
13 ink bleed artifacts
20 black input image cross-section
21 cyan input image cross-section
30 low-pass convolution filter
32 low-pass filtered black image cross-section
40 hi-pass convolution filter
42 hi-pass filtered black image cross-section
50 input digital image
51 black color channel
52 additional color channels
53 convolution operation
54 filtered black color channel
55 form modified additional color channels step
56 modified additional color channels
57 modified digital image
58 color transform operation
59 form color dependent scale factor step
60 color dependent scale factor channel
61 compute total colorant amount step
62 compute volume tapering function step
63 compute ink adjustment factor step
64 compute edge tapering function step
66 compute scale factor step
68 multiplier
69 multiplier
70 multiplier
71 form modified input color channels step
76 compute scale factor step
80 color dependent scale factor channels
81 form modified input color channels step
82 inverse color transform operation
86 compute scale factor step
90 host PC
91 application
92 print driver
93 inkjet printer
94 ASIC controller
95 CPU

The invention claimed is:

1. A method for modifying an input digital image having three color channels, each color channel having an (x,y) array of pixel values, to form a modified digital image suitable for use by an inkjet printer using colored and black inks to form a printed image having reduced ink bleed artifacts, comprising:
   a) computing a transformed digital image responsive to the input digital image, wherein the transformed digital image contains at least a black color channel and a color dependent scale factor channel;
   b) computing a filtered black color channel from the black color channel using a convolution operation; and
   c) forming the modified digital image by modifying pixel values in the input digital image in response to the corresponding pixel values of the color dependent scale factor channel and the filtered black color channel, so that when the modified digital image is used to produce a printed image on an inkjet printer there are reduced ink bleed artifacts, wherein the modified digital image has the same three color channels as the input digital image.

2. The method of claim 1 wherein the transformed digital image is computed using a multidimensional look-up table indexed by the image pixel values of the input digital image.

3. The method of claim 1 wherein the convolution operation in step b) includes convolving the black color channel with a low-pass convolution filter to produce the filtered black color channel.

4. The method of claim 3 wherein the low-pass convolution filter is a box filter.

5. The method of claim 1 wherein the convolution operation in step b) includes convolving the black color channel with a hi-pass convolution filter to produce the filtered black color channel.

6. The method of claim 5 wherein the pixel values of the filtered black color channel are further modified by an absolute value operation.

7. The method of claim 1 wherein the image pixel values of at least one of the color channels of the input digital image are modified such that reduced ink amounts are printed for at least one of the colored inks in image regions where the pixel values of the filtered black color channel are larger than a predefined threshold, thereby producing reduced ink bleed artifacts.

8. The method of claim 1 wherein pixel values of the color dependent scale factor channel (Q), are determined using the equation:

$$Q = \text{Clip}(S_I \times S_V(V_T), 0, 1)$$

where $V_T$ is a total colorant amount, $S_I$ is an ink adjustment factor, and $S_V(\ )$ is a volume tapering function, and Clip (A,min,max) is a function that clips the value of the argument A to the range between min and max.

9. The method of claim 1 wherein step c) includes:
i) determining pixel-dependent scale factor(s) for the color channels of the input digital image in response to the corresponding pixel values of the color dependent scale factor channel and the filtered black color channel; and
ii) scaling the pixel values of the input digital image using the pixel-dependent scale factor(s) to determine pixel values for the modified digital image.

10. The method of claim 9 wherein the pixel-dependent scale factors ($S_A$), are determined using the equation:

$$S_A = 1 - [Q \times S_E(K_f)]$$

where $K_f$ is the pixel value of the filtered black color channel, Q is the pixel value of the color dependent scale factor channel, and $S_E(\ )$ is an edge tapering function.

11. The method according to claim 9 wherein the pixel-dependent scale factor(s) are determined by addressing one or more look-up table(s) with the pixel value of the filtered black color channel.

12. The method according to claim 1 wherein the pixel values of the modified digital image are determined by using a functional relationship having inputs including the corresponding pixel values of the input digital image, the color dependent scale factor channel, and the filtered black color channel.

13. The method according to claim 1 wherein only regions of the input digital image containing text, graphics, or both are modified.

14. The method according to claim 13 wherein an automatic detection algorithm is used to detect text and graphics regions of the input digital image.

15. The method of claim 1 wherein the transformed digital image is computed by applying a color transform using a color transform process.

16. A method for modifying an input digital image having three color channels, each color channel having an (x,y) array of pixel values, to form a modified digital image suitable for use by an inkjet printer using colored and black inks to form a printed image having reduced ink bleed artifacts comprising:
a) computing a transformed digital image responsive to the input digital image, wherein the transformed digital image contains at least a black color channel and three color dependent scale factor channels, each of the three color dependent scale factor channels corresponding to one of the color channels of the input image;
b) computing a filtered black color channel from the black color channel using a convolution operation; and
c) forming the modified digital image by modifying pixel values in the input digital image in response to the corresponding pixel values of the color dependent scale factor channels and the filtered black color channel, so that when the modified digital image is used to produce a printed image on an inkjet printer there are reduced ink bleed artifacts, wherein the modified digital image has the same three color channels as the input digital image.

17. The method of claim 16 wherein step c) includes:
i) determining a pixel-dependent scale factor for each color channel of the input digital image in response to the corresponding pixel values of the filtered black color channel and the corresponding color dependent scale factor channel; and
ii) scaling the pixel values for each color channel of the input digital image using the corresponding pixel-dependent scale factor to determine the pixel values of the modified digital image.

18. A method for modifying an input digital image having three color channels, each color channel having an (x,y) array of pixel values, to form a modified digital image suitable for use by an inkjet printer using colored and black inks to form a printed image having reduced ink bleed artifacts comprising:
a) computing a transformed digital image responsive to the input digital image by applying a color transform using a color transform process, wherein the transformed digital image contains at least a black color channel and one or more additional color channels;
b) computing a color dependent scale factor channel responsive to the pixel values of the transformed digital image;
c) computing a filtered black color channel from the black color channel using a convolution operation;
d) computing a modified transformed digital image by modifying pixel values in one or more of the additional color channels of the transformed digital image in response to the corresponding pixel values of the color dependent scale factor channel and the filtered black color channel; and
e) transforming the modified transformed digital image to form a new modified digital image by using an inverse color transform process to apply an inverse color transform, wherein the inverse color transform is substantially an inverse of the color transform applied in the color transform process, such that when the modified digital image is used to produce a printed image on an inkjet printer there are reduced ink bleed artifacts.

19. The method of claim 18 wherein the color transform is a multi-dimensional color transform look-up table having three input color channels and four output color channels, and wherein the multi-dimensional color transform look-up table is indexed by the pixel values of the input digital image.

20. The method of claim 18 wherein the inverse color transform is a multi-dimensional inverse color transform look-up table having four input color channels and three output color channels, and wherein the multi-dimensional inverse color transform look-up table is indexed by the pixel values of the modified transformed digital image.

* * * * *